(12) United States Patent
Kaplan

(10) Patent No.: US 7,129,853 B2
(45) Date of Patent: Oct. 31, 2006

(54) SYSTEM AND METHOD FOR REMOTE CONTROL OF A WIRELESS HANDSET

(75) Inventor: Diego Kaplan, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 281 days.

(21) Appl. No.: 10/716,053

(22) Filed: Nov. 18, 2003

(65) Prior Publication Data

US 2005/0104717 A1  May 19, 2005

(51) Int. Cl.
*G08C 19/00* (2006.01)
(52) U.S. Cl. .............................. 340/825.69; 340/825.72
(58) Field of Classification Search ........... 340/825.69, 340/825.72, 825.62, 505, 506; 709/224, 709/232, 204; 382/249, 239; 348/14.04, 348/143
See application file for complete search history.

(56) References Cited

U.S. PATENT DOCUMENTS 5,898,386 A * 4/1999 Kaihatsu ................ 340/825.69
6,608,841 B1 * 8/2003 Koodli ........................ 370/474
6,686,838 B1 * 2/2004 Rezvani et al. ............. 340/506

* cited by examiner

*Primary Examiner*—Brian Zimmerman
*Assistant Examiner*—William Bangachon

(57) ABSTRACT

Systems and methods for remote control of a wireless communication device are provided. Remote access to a wireless communication device is obtained through a packet switched mobile terminated data call. The data call can also be originated from the wireless communication device. Authentication and validation procedures facilitate secure remote control access to the wireless communication device by one or more remote control access points. Once a remote control access session has been established, the remote control access point can execute commands on the wireless communication device, including initiating voice calls and scheduling future commands. Additionally, an audio-video teleconference can be initiated using streaming video and voice over IP.

18 Claims, 8 Drawing Sheets

SYSTEM AND METHOD FOR REMOTE CONTROL OF A WIRELESS HANDSET

BACKGROUND

1. Field of the Invention

The present invention generally relates to wireless communications and more particularly relates to remote control of wireless communication devices via a wireless communication network.

2. Related Art

Conventional wireless communication devices may only be operated by a local user. This operation is typically through the conventional browser based operating system provided on the device, using the keypad for input or perhaps using voice commands. Some wireless communication devices permit access by a computer program to perform diagnostics or other maintenance related items. Furthermore, wireless communication devices are typically single user devices that do not allow multiple users to access the device.

A significant problem with these conventional devices is that as the devices gain sophistication in software and applications, customer service agents face an increasingly difficult time troubleshooting problems that occur on the devices. Additionally, owners of a wireless communication device often lose or misplace the device and have no ability to contact the missing device. Therefore, what is needed is a system and method that overcomes these significant problems found in conventional wireless communication devices as described above.

SUMMARY

Remote access to a wireless communication device is provided through a packet switched mobile terminated data call. The data call can be originated from a remote control access point or from the wireless communication device. Authentication and validation procedures facilitate secure remote control access to the wireless communication device by one or more remote control access points. Once a remote control access session has been established, the remote control access point can execute commands on the wireless communication device, including initiating voice calls and scheduling future commands. Additionally, an audio-video teleconference can be initiated using streaming video and voice over IP.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Disclosed herein are various systems and methods for remote control of a wireless communication device. In particular, access to a wireless communication device is obtained by a remote control access point via a wireless communication network. Once remote access has been established, the remote control access point can execute certain functions on the wireless communication device. These functions can advantageously include the complete set of functions available to a user who has possession of the wireless communication device, and more.

In this detailed description, the term wireless communication device may be used interchangeably with "handset," "wireless device," and "wireless handset." Similarly, the term remote control access point may be used interchangeably with "access point," "remote access point," and "remote device."

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
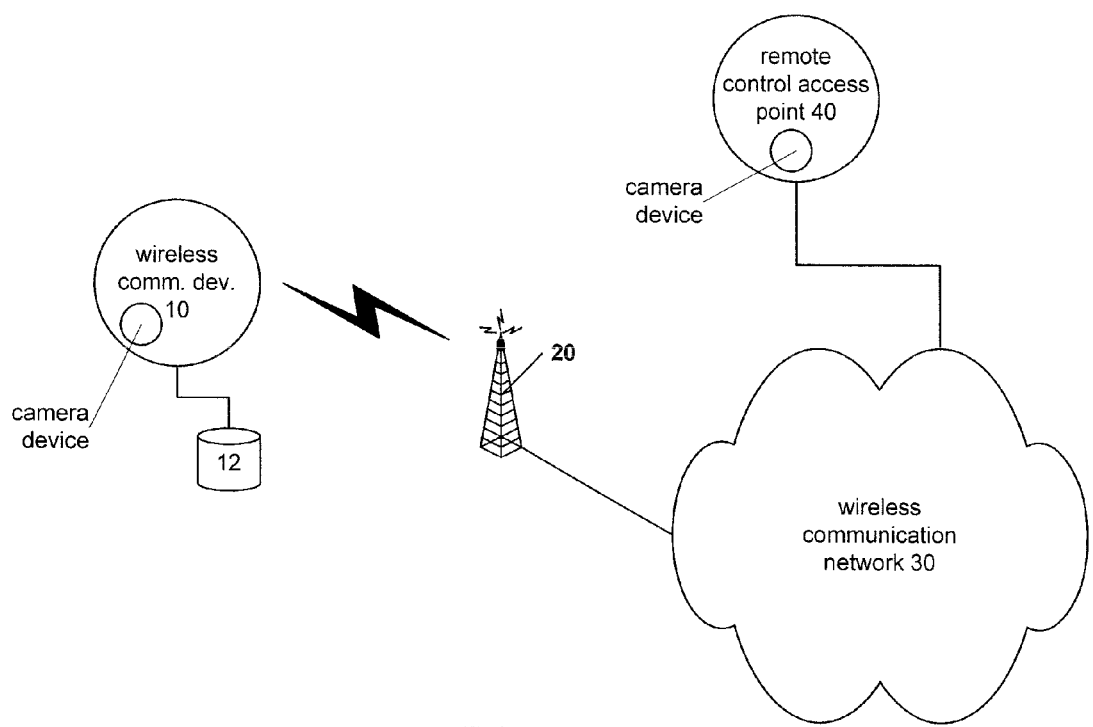
FIG. 1 is a high level network diagram illustrating an example system for remote control of a wireless communication device from a remote control access point within a wireless communication network.

FIG. 1 is a high level network diagram illustrating an example system for remote control of a wireless communication device 10 from a remote control access point 40 within a wireless communication network 30. In the illustrated embodiment, the wireless communication device 10 is coupled with a data storage area 12. The wireless communication device 10 is also communicatively coupled with wireless communication network 30 through a base station 20. Remote control access point 40 is considered to be part of the wireless communication network 30. Although not illustrated for the sake of simplicity, there can be more than one wireless communication device 10, more than one base station 20, and more than one remote control access point 40.

The wireless communication device 10 can be any type of device capable of wireless communication with network 30. For example, device 10 may be an analog or digital cell phone, a personal digital assistant ("PDA"), a personal computer ("PC"), laptop computer, tablet computer, or other type of device with the ability to communicate over wireless network 30. Preferably, wireless communication device 10 is capable of both voice calls (circuit switched) and data calls (packet switched). Additionally, wireless communication device 10 is preferably capable of simultaneous voice and data calls as well as being capable of more than one data call at a given time.

Throughout this description the wireless communication device will be discussed in the context of an analog or digital cell phone. It is to be understood, however, that any type of wireless communication device may be used in place of an analog or digital cell phone.

The wireless communication device 10 is coupled with a data storage area 12. The data storage area can be implemented as a persistent memory device or a volatile memory device. For example, data storage area 12 can be a read only memory ("ROM") random access memory ("RAM"), flash memory, programmable ROM, or conventional hard drive, just to name a few. The physical medium employed as data storage area 12 can employ various types of data storage organization means such as a file system structure, database structure, or the like.

Data storage area 12 can preferably be used to store executable programs, audio files, graphic image files, text files, audio-video files, and other types of data and information. For example, the operating system of the wireless communication device 10 can be stored in data storage area 12. Other examples of programs, files, and information that can be housed in data storage area 12 include custom ring audio files, display background image files, contact information text files (or database files), digital photograph image files, and digital video audio-video files, just to name a few. Other types of files, data, and information can also be stored in data storage area 12, as will be understood by one having skill in the art.

Wireless communication network 30 typically encompasses a number of base stations such as base station 20. The wireless communication network 30 can be managed by a wireless communication service provider (i.e., access provider) such as Sprint, Verizon, AT&T Wireless, and T-Mobile, just to name a few. In the illustrated embodiment, remote control access point 40 is part of the wireless communication network 30. For example, the remote control access point 40 can be a customer service technician's desktop computer. Alternatively, remote control access point can be a provisioning server maintained and used by the access provider. In one embodiment, the remote control access point can be provided through a web client interface that can allow unrestricted or password protected access via the Internet.

Furthermore, wireless communication network 30 can be a bridge between the wireless communication device 10 and other communication networks. For example, the wireless communication network 30 can act as a bridge network between the wireless communication device 10 and a circuit switched network such as a public switched telephone network (not shown). Such a bridge function may facilitate voice calls placed by or to the wireless communication device 10.

Alternatively, or in combination, wireless communication network 30 can act as a bridge network between the wireless communication device 10 and a packet switched data network, such as a private local area network ("LAN") or a public network such as the Internet (both not shown). Such a bridge function may facilitate data calls placed by or to the wireless communication device 10.

In the illustrated embodiment, remote control access point 40 can initiate a remote control connection with wireless communication device 10. The remote control connection can be initiated directly or indirectly. For example, an indirect initiation may be effected by the remote control access point 40 sending a simple messaging system ("SMS") message to the wireless communication device 10, instructing the device 10 to initiate a data call to the remote control access point 40. Alternatively, the remote control connection may also be initiated by the wireless device 10.

Once the remote control connection is established, the remote control access point 40 can run any programs or utilities available in the data storage area 12. Additionally, the remote control access point 40 may copy files to or copy files from the data storage area 12. The remote control access point 40 may also perform other file maintenance functions such as creating, modifying, or deleting files and the like. In one embodiment, the remote control access point 40 can initiate a voice call on the wireless communication device 10.

Figure 2:
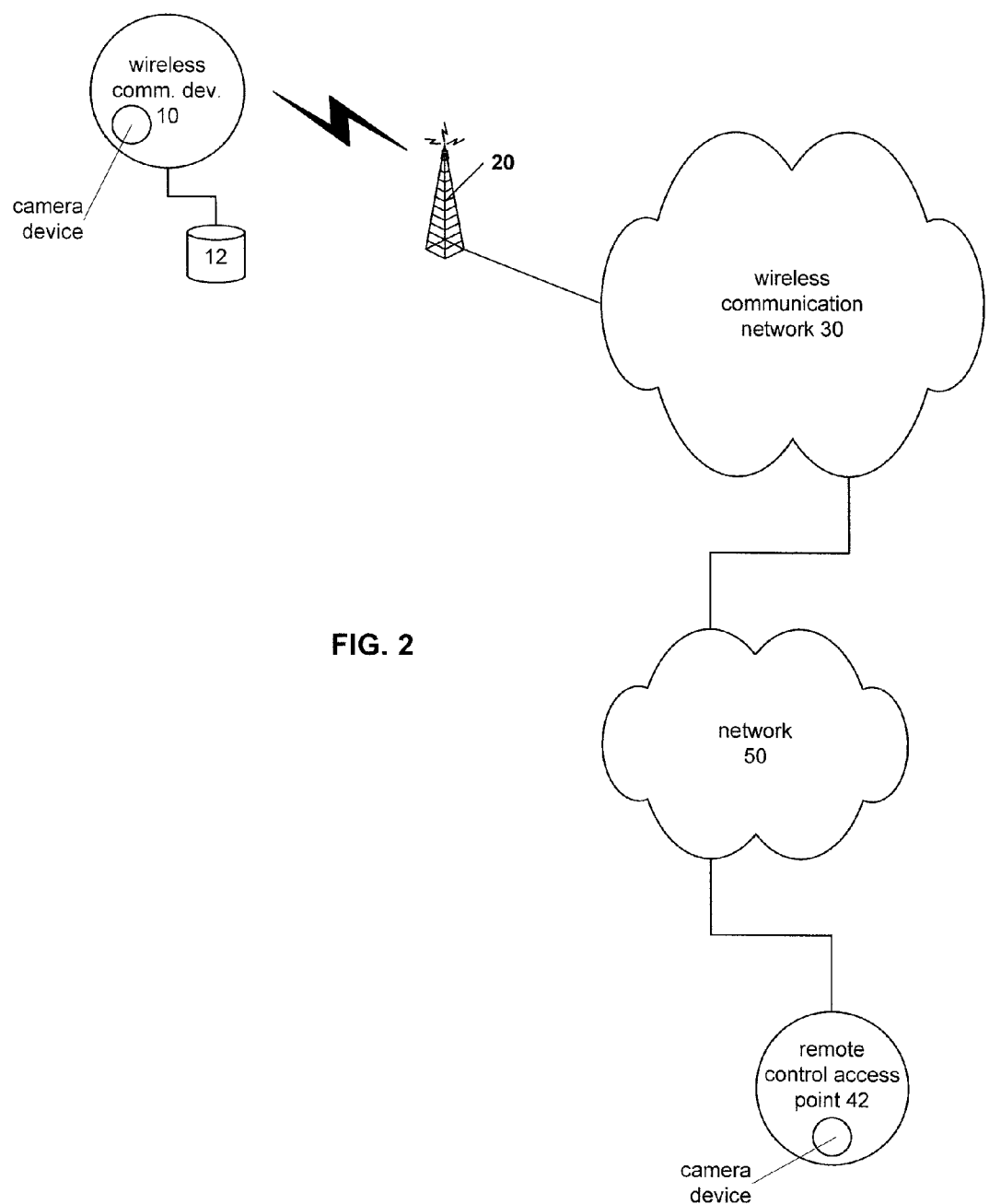
FIG. 2 is a high level network diagram illustrating an example system for remote control of a wireless communication device from a remote control access point external to a wireless communication network.

FIG. 2 is a high level network diagram illustrating an example system for remote control of a wireless communication device 10 from a remote control access point 42 external to a wireless communication network 30. In the illustrated embodiment, wireless communication device is communicatively coupled with a remote control access point 42 via base station 20 of wireless communication network 30 and a network 50. Additionally, wireless communication device is configured with a data storage area 12.

Network 50 can advantageously be a public or private packet switched network. For example, a corporate LAN or the Internet may be employed as the network 50. In the illustrated embodiment, remote control access point 42 can any computing device capable of communication over wireless communication network 30. For example, remote control access point 42 can be a home PC operated by the owner of the wireless communication device. Alternatively, remote control access point 42 can be a computing device operated by a public or private investigative body such as the police or the FBI, for example.

In the illustrated embodiment, remote control access point 42 can initiate a remote control connection with wireless communication device 10. The remote control connection can be initiated directly or indirectly. For example, an indirect initiation may be effected by the remote control access point 42 sending a simple messaging system ("SMS") message to the wireless communication device 10, instructing the device 10 to initiate a data call to the remote control access point 42. Alternatively, the remote control connection may also be initiated by the wireless device 10.

Once the remote control connection is established, the remote control access point 42 can run any programs or utilities available in the data storage area 12. Additionally, the remote control access point 42 may copy files to or copy files from the data storage area 12. The remote control access point 42 may also perform other file maintenance functions such as creating, modifying, or deleting files and the like. In one embodiment, the remote control access point 42 can initiate a voice call on the wireless communication device 10.

Figure 3:
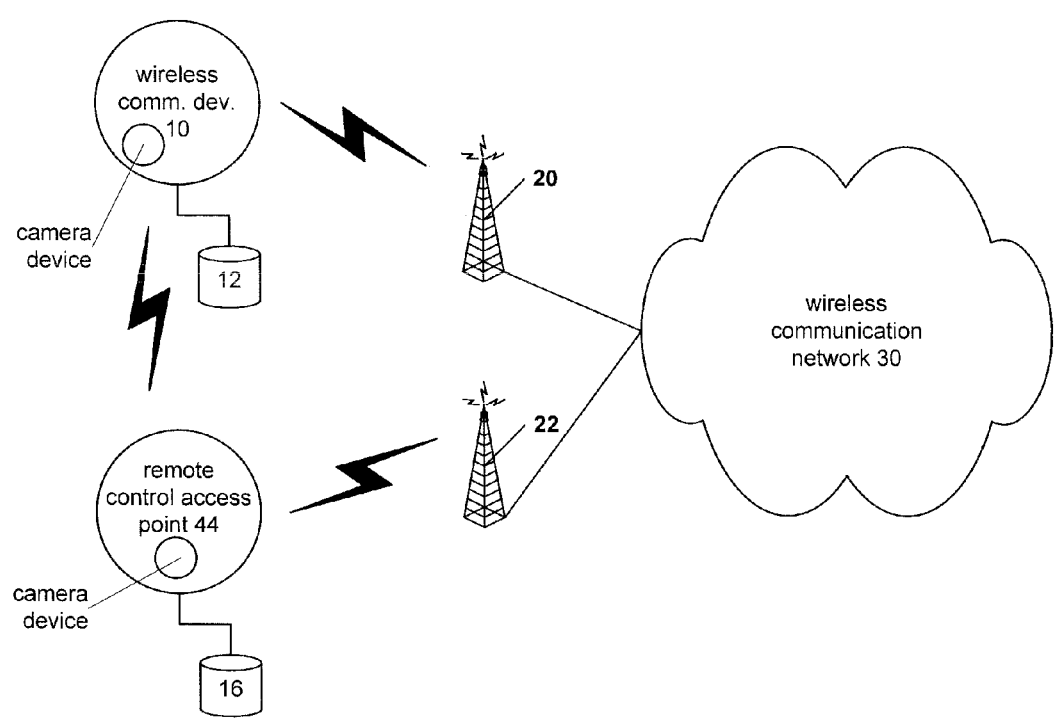
FIG. 3 is a high level network diagram illustrating an example system for remote control of a wireless communication device from a wireless remote control access point.

FIG. 3 is a high level network diagram illustrating an example system for remote control of a wireless communication device 10 from a wireless remote control access point 44. In the illustrated embodiment, wireless communication device 10 has a data storage area 12 and is communicatively coupled with a wireless communication network 40 through a base station 20. Alternatively, the wireless communication device 10 may be connected to the wireless communication network 40 through base station 22.

Similarly, in the illustrated embodiment, wireless remote control access point 44 is communicatively coupled with wireless communication network 40 through base station 22. Alternatively, the wireless remote control access point 44 may be connected to the wireless communication network 40 through base station 20. Also, the wireless remote control access point 44 is preferably configured with a data storage area 16.

The wireless communication device 10 and the wireless remote control access point 44 may be communicatively coupled to each other through the wireless communication network 40. Alternatively, the wireless communication device 10 and the wireless remote control access point 44 may be communicatively coupled to each other through a direct connection between the two devices.

Advantageously, the wireless remote control access point 44 can be any type of device capable of wireless communication with network 30. For example, device 10 may be an analog or digital cell phone, a PDA, a PC, laptop computer, tablet computer, or other type of device with the ability to communicate over wireless network 30. Preferably, remote control access point 44 is capable of both circuit switched communications and packet switched communications. Additionally, remote control access point 44 is preferably capable of simultaneous circuit switched and packet switched communications as well as being capable of more than one packet switched connection at a given time.

In the illustrated embodiment, remote control access point 44 can initiate a remote control connection with wireless communication device 10. The remote control connection can be initiated directly or indirectly. For example, an indirect initiation may be effected by the remote control access point 44 sending a simple messaging system ("SMS") message to the wireless communication device 10, instructing the device 10 to initiate a data call to the remote control access point 44. Alternatively, the remote control connection may also be initiated by the wireless device 10.

Once the remote control connection is established, the remote control access point 44 can run any programs or utilities available in the data storage area 12. Additionally, the remote control access point 44 may copy files to or copy files from the data storage area 12. The remote control access point 44 may also perform other file maintenance functions such as creating, modifying, or deleting files and the like. In one embodiment, the remote control access point 44 can initiate a voice call on the wireless communication device 10.

Figure 4:
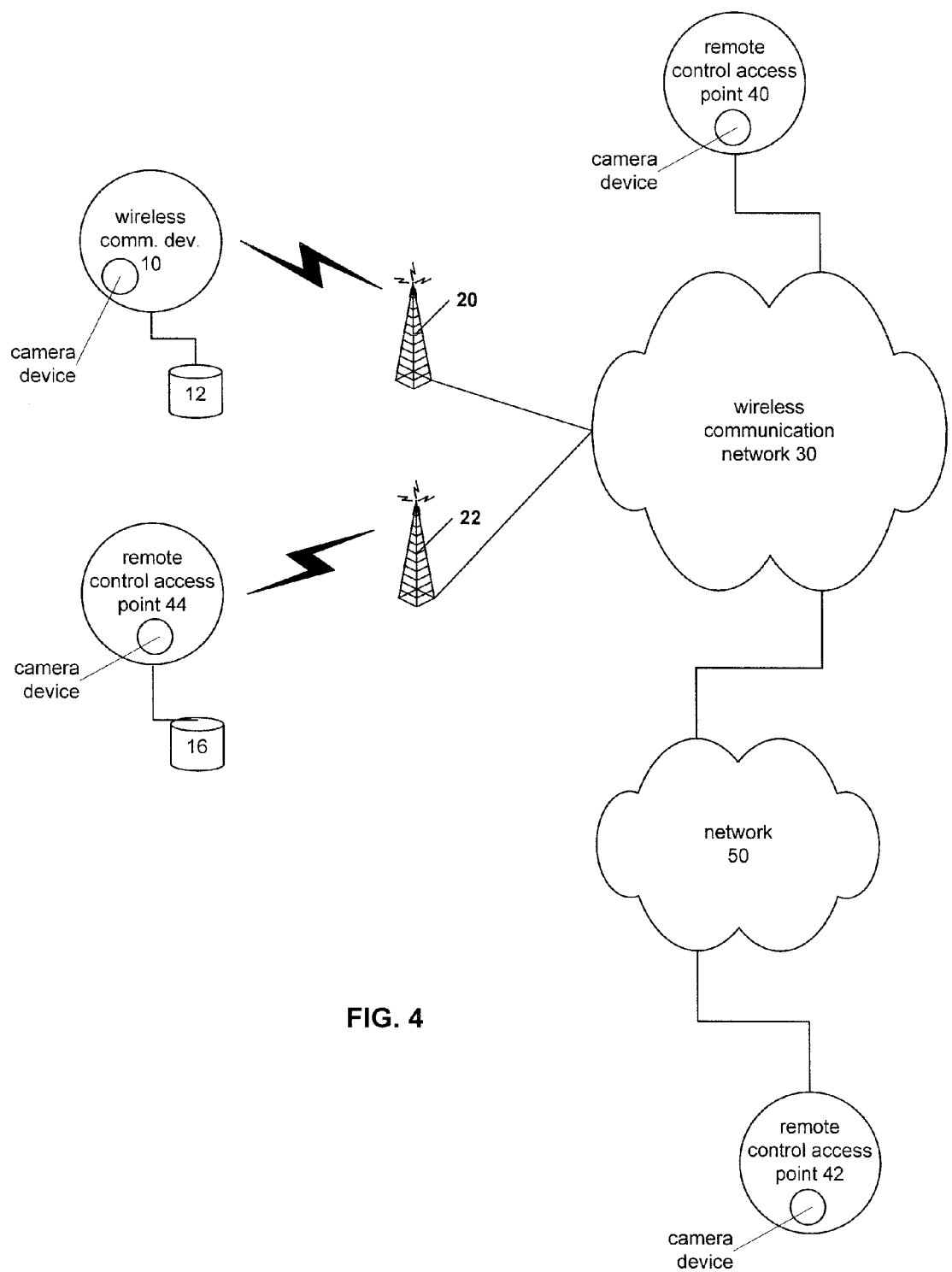
FIG. 4 is a high level network diagram illustrating an example system for multi-user remote control of a wireless communication device.

FIG. 4 is a high level network diagram illustrating an example system for multi-user remote control of a wireless communication device 10. In the illustrated embodiment, wireless communication device 10 is configured with a data storage area 12 and is communicatively coupled with a wireless communication network 30 via a base station 20. Alternatively, wireless communication device can be connected to wireless communication network 30 via base station 22.

In the illustrated embodiment, various remote control access points 40, 42, and 44 are shown. Each of the remote control access points 40, 42, and 44 are communicatively coupled with wireless communication device 10 via wireless communication network 30. For example, remote control access point 40 is considered part of the wireless communication network 30 and can be a computing platform such as a customer service terminal or a provisioning terminal. Additionally, remote control access point 42 is communicatively coupled with wireless communication network 30 via a network 50 and can be a computing platform such as PC or laptop. Network 50 is preferably a packet switched network such as a private LAN or the Internet. Furthermore, remote control access point 44 is communicatively coupled with wireless communication network 30 via base station 22, or alternatively base station 20 and can be a wireless communication device of the same type as wireless communication device 10.

In the illustrated embodiment, each of the remote control access points 40, 42, and 44 can initiate a remote control connection with wireless communication device 10. The remote control connection can be initiated directly or indirectly. For example, an indirect initiation may be effected by a remote control access point sending a simple messaging system ("SMS") message to the wireless communication device 10, instructing the device 10 to initiate a data call to the requesting remote control access point. Alternatively, the remote control connection may also be initiated by the wireless device 10.

As shown in the illustrated embodiment, each of the remote control access points 40, 42, and 44 can be contemporaneously connected with wireless communication device 10. For example, remote control access points 40 and 42 can each have an established remote control connection (i.e., packet switched connection) with wireless communication device 10 and the device 10 can preferably establish an additional remote control connection with remote control access point 44. Furthermore, while maintaining one or more remote control connections, wireless communication device 10 can preferably establish a voice call (i.e., circuit switched connection), either by initiating the voice call or receiving the voice call.

Moreover, while the various remote control connections are in place, the remote control access points 40, 42, and 44 can run any programs or utilities available in the data storage area 12 on wireless communication device 10. Additionally, the remote control access points 40, 42, and 44 may copy files to or copy files from the data storage area 12. The remote control access points 40, 42, and 44 may also perform other file maintenance functions such as creating, modifying, or deleting files and the like. Advantageously, certain file maintenance protections can be in place on the wireless communication device 10 to prevent the contemporaneous accumulation of changes to a single file by multiple remote access points. Such protections preferably maintain the integrity of the files and information stored in data storage area 12.

Figure 5:
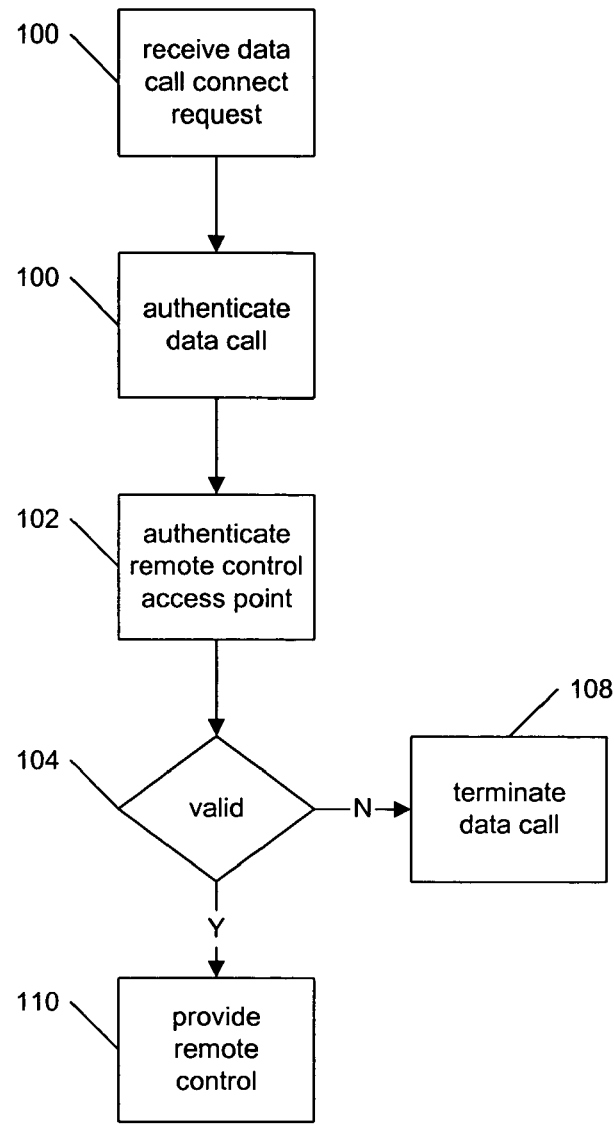
FIG. 5 is a flow diagram illustrating an example method for initializing remote control of a wireless communication device.

FIG. 5 is a flow diagram illustrating an example method for initializing remote control of a wireless communication device. Initially, in step 100, the handset receives a remote control connect request. The remote control connect request may come by way of a direct data call to the handset from a remote control access point or by way of an indirect request (e.g., SMS message) to establish a data call with a remote control access point.

Once the connect request has been received, the handset establishes a data call with the remote control access point, as illustrated in step 102. Next, in step 104, the handset authenticates the remote control access point. Authentication may be carried out in a variety of ways, as will be understood by those having skill in the art. For example, the handset may issue a user name challenge to the remote control access point and require a valid user name in response. Additionally, or alternatively, the handset may issue a password challenge to the remote control access point and require a valid password in response. Preferably, a user name and password combination is employed to provide more robust security to the remote control features of the handset.

Alternatively, authentication may be carried out by parsing the connect request. For example, the connect request can include a user name and password combination or some other identifying information such as a unique remote control access point identifier and a security code. These elements comprising the identifying information are preferably stored on the handset and the handset can parse the incoming connect request to obtain the identifying information elements and then compare those elements with the identifying information stored locally with the handset to validate the remote control access point. Of course, various combinations of identifying information can be stored at the handset to allow multiple remote control access points to access the handset.

If the authentication step indicates that the remote control access point is not a valid remote control access point (or not a valid user), as determined in step 106, then the established data call is terminated, as shown in step 108. In one embodiment, all failed authentication attempts are logged by the handset for security or other purposes, for example troubleshooting. If, on the other hand, the authentication step indicates that the remote control access point is a valid user, then in step 110 the handset provides remote control to the remote control access point. Additionally, any successful authentication attempts can also be logged by the handset to keep records for security or other purposes.

In one embodiment, when remote control access is provided to the remote control access point, a message can be sent to the display screen of the handset to notify any local user of the handset that a remote control session has been established. Alternatively a stealth remote control access mode may be employed that does not provide any notice to a local user of the handset. Such a stealth mode may be activated in real time, for example, by a remote control command issued by the remote control access device within a certain number of commands or within a certain time period after authentication and establishment of the remote control session.

Preferably, remote control is provided using a remote control protocol that can be implemented over a data call. For example, the remote control protocol may be an application layer protocol that is carried over a TCP/IP or other packet switched network infrastructure. Thus, the remote control access point can execute commands on the handset once the session has been established. Preferably, the remote control access point can read and write data over the wireless connection.

Figure 6:
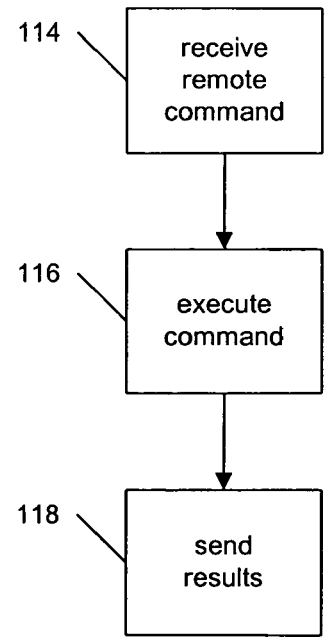
FIG. 6 is a flow diagram illustrating an example method for executing remote control commands on a wireless communication device.

FIG. 6 is a flow diagram illustrating an example method for executing remote control commands on a wireless communication device. Initially, in step 114, the handset receives a remote command from the remote control access point. Remote commands preferably include all commands that are available to a local user of the handset and can also include additional service, troubleshooting, and other commands that are not available to a local user of the handset. For example, a remote control command for downloading a file may be available. Accordingly, a remote control access point may download a custom executable command to the handset and then execute that command while a local user of the handset would not have access to the custom executable command.

Upon receipt of the remote control command, the handset preferably carries out the command, as illustrated in step 116. For example, such commands may include (but are not limited to): terminating a voice call; terminating a data call; initiating a voice call; initiating a data call; recording audio; taking a photograph; recording audio and video; obtaining GPS location information; providing log file information; and locking the handset to prevent local user use of the handset.

In an alternative embodiment, the remote control access point can schedule commands to be executed after the remote control access session is terminated. Such a scheduling option preferably allows a series of commands to be scheduled for execution either immediately after the remote control session ends or for some other future time. Advantageously, a script file containing a series of commands may also be schedule so that the commands may all be compiled in a single file and the handset instructed to execute the commands in the file at a particular future point in time.

Once the handset has executed the remote control command, the handset can send any results to the remote control access point, as shown in step 118. For example, the handset may send various types of results to the remote control access point including GPS location information (in GPS format or translated to a different format), a digital image file, an audio file, an audio and video file, a text file, a confirmation notice, an error message, and streaming audio and video, just to name a few.

Figure 7:
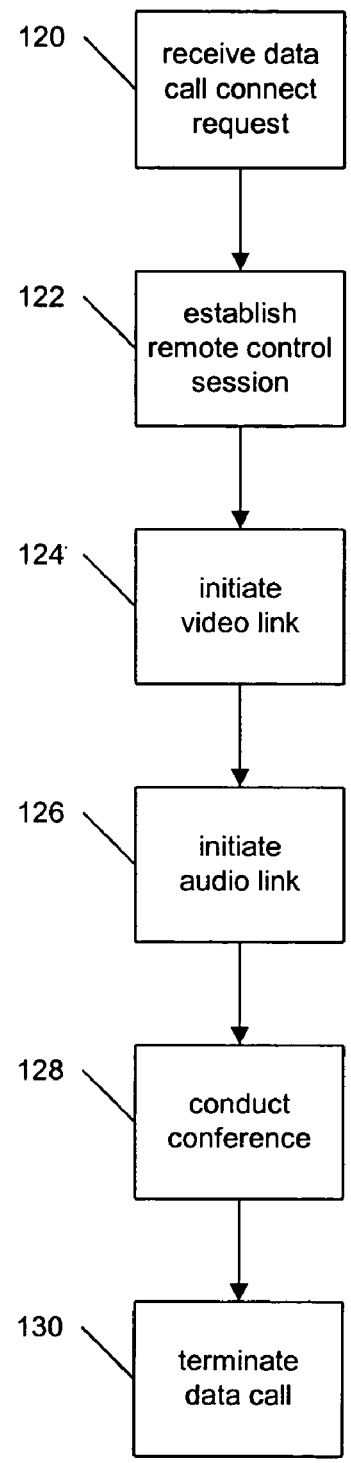
FIG. 7 is a flow diagram illustrating an example method for implementing an audio-video teleconference via remote control on a wireless communication device.

FIG. 7 is a flow diagram illustrating an example method for implementing an audio-video teleconference via remote control on a wireless communication device. Initially, in step 120, the handset receives a data call connect request from a remote control access point. Next the handset establishes a remote control session, as illustrated in step 122 and previously described with respect to FIG. 6.

Once the remote control session has been established, in step 124 the handset initiates a video link with the remote control access point. The video link can be a one-way link, but is preferably a two-way link. Preferably, the video link comprises a real time or very near real time video stream. If the handset or the remote control access point is not capable of a video stream, the handset may send a graphic image file such a digital picture of the local operator of the handset. Preferably, the visual link component (either streaming video or graphic image) conveys the visual nature of the local operator of the handset or the location of the handset.

Additionally, in step 126 the handset initiates an audio link with the remote control access point. The audio link can be a one-way link, but is preferably a two-way link. The audio link can be a voice call over a circuit switched connection or a voice-over-internet-protocol ("VOIP") session over the established packet switched connection (e.g., the data call). Preferably, the audio component (either voice call or VoIP) creates a real time or very near real time aural connection between the handset and the remote control access point. It should be noted that the creation of the audio link and the visual link components can take place serially, or in parallel. Furthermore, neither link is preferred to be initiated before the other and therefore they can be established in the order shown in FIG. 7 or otherwise.

When the audio link and the video link have been established, an audio-visual conference can be conducted, as illustrated in step 128. Once the audio-visual conference is completed, the data call can be terminated in step 130. Alternatively, the data call can remain in place upon completion of the audio-visual conference while the audio link and video link are terminated. Thus, additional remote control commands can be given after the termination of the conference and prior to the termination of the remote control session.

Figure 8:
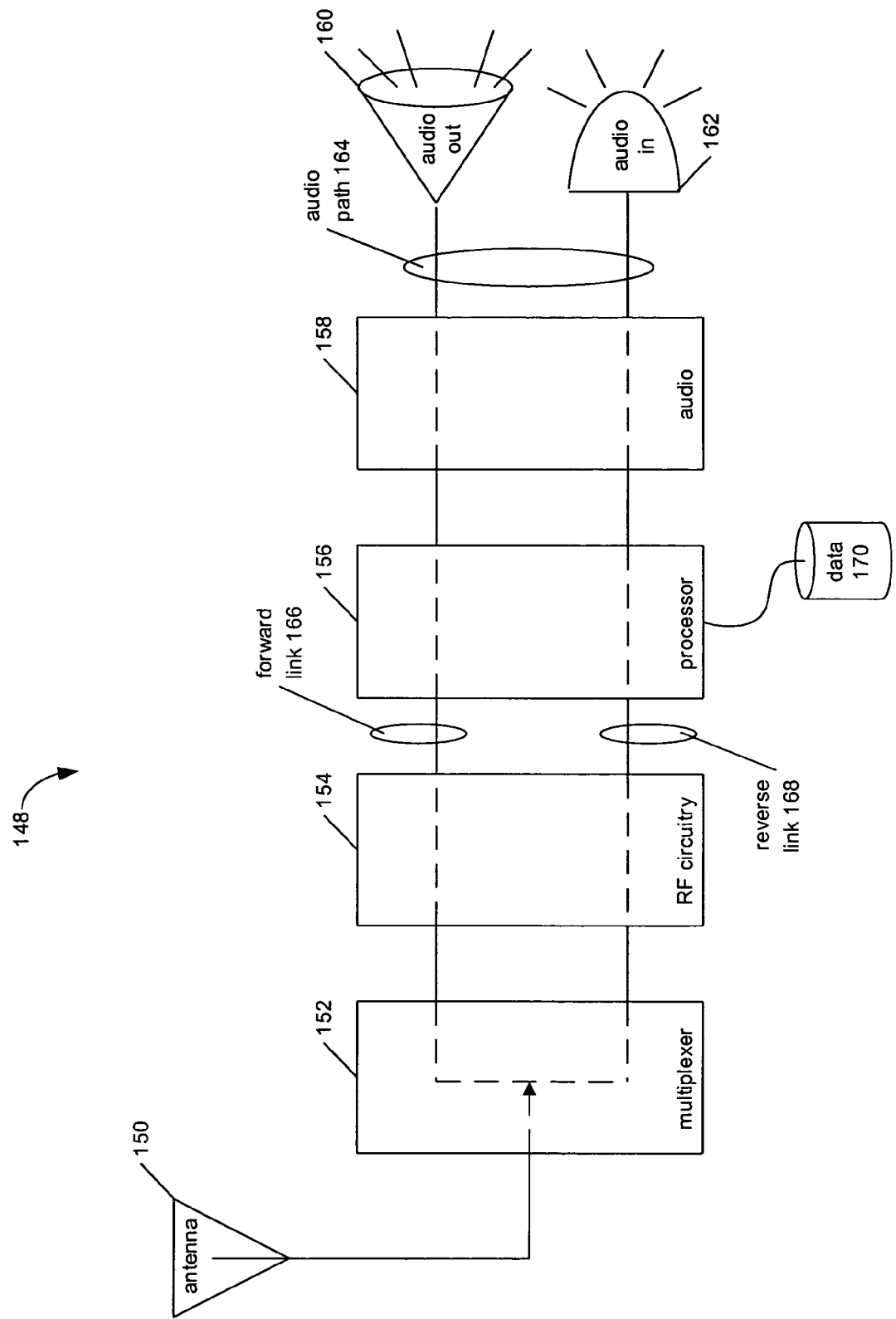
FIG. 8 is a block diagram illustrating an example wireless communication device as may be used in connection with various embodiments described herein.

FIG. 8 is a block diagram illustrating an example wireless communication device 148 as may be used in connection with various embodiments described herein. For example, wireless communication device 148 may be used as a wireless handset or as a wireless remote control access point. Wireless communication device 148 comprises an antenna 150, a multiplexor 150, RF circuitry 154, a processor 156, audio circuitry 158, a speaker 160, and a microphone 162. Wireless communication device 148 also has an audio path 164 that comprises a forward link 166 and a reverse link 168. Additionally, wireless communication device 148 also has a data storage area 170.

The components of device 148 work in concert to facilitate wireless communication over a wireless communication network (not shown). Generally, multiplexor 152 combines and separates the signals in the audio path 164. The RF circuitry 154 modulates and demodulates the audio signals in the audio path 164. The processor 156 encodes and decodes the audio signals in the audio path 164. The processor 156 additionally may handle the user interface and other functions of the wireless communication device, including managing the data storage area 170. The audio circuitry 158 performs analog to digital conversion for audio signals in the reverse link 168 and also performs digital to analog conversion for audio signals in the forward link 166.

The workings of the various components of device 148 are well known in the art and the illustrated functional components can be implemented in a variety of physical combinations, for example, the audio conversion function can be integrated into the processor 156. The various alternative implementations of the wireless communication device 148 are all contemplated to work with the claimed invention. Thus, the illustrated embodiment of wireless communication device 148 shall not be construed to limit the claimed invention in any fashion.

The antenna 150 is adaptable to receive wireless communication signals in the conventional fashion. Advantageously, the wireless communication signals may be for both voice and data services. Similarly, the speaker 160 and the microphone 162 are adaptable to provide and receive analog audio signals in the conventional fashion. The forward link 166 of the audio path 164 is the audio channel for incoming audio. Audio signals on the forward link 166 typically include those audio signals that are received by the antenna 150. The reverse link 168 of the audio path 164 is the audio channel for outgoing audio. Audio signals on the reverse link 168 typically include those audio signals that are received by the microphone 162.

Data signals received by the antenna 150 are preferably provided to the processor 156 via the forward link 166. Similarly, data signals that are destined for a remote device are preferably sent to the antenna 150 from the processor 156 over the reverse link 168.

Figure 9:
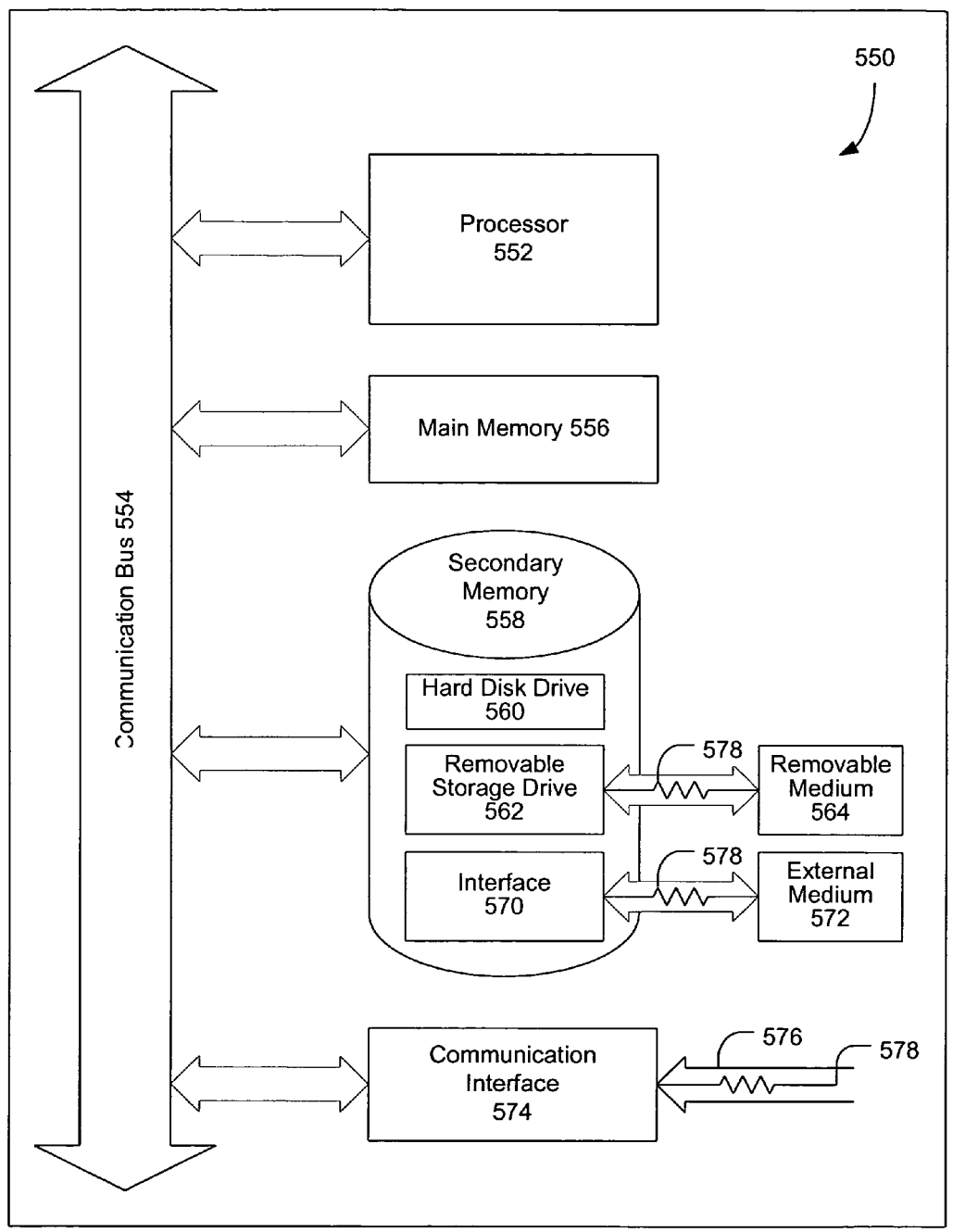
FIG. 9 is a block diagram illustrating an example computer system as may be used in connection with various embodiments described herein.

FIG. 9 is a block diagram illustrating an exemplary computer system 550 that may be used in connection with the various embodiments described herein. For example, the computer system 550 may be employed as a remote control access point such as a user PC, a customer service terminal, and a provisioning server, just to name a few. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of communication means including wire or cable, fiber optics, conventional phone line, cellular phone link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

While the particular systems and methods for remote control of a wireless communication device herein shown and described in detail is fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method for a remote control access point to gain remote control of a wireless communication device, the method comprising:
   receiving a data call request from a remote control access point via a wireless communication network;
   establishing a data call with the remote control access point;
   receiving authentication information from the remote control access point;
   validating the authentication information;
   providing the remote control access point with access to a plurality of remote control programs; and
   scheduling a remote control program for execution at a future time, wherein the future time is after the data call is terminated.

2. The method of claim 1, further comprising:
   executing a first remote control program to establish an audio link with the remote control access point; and
   executing a second remote control program to establish a video link with the remote control access point, wherein the audio link and video link in combination establish a video conference between the wireless communication device and the remote control access point.

3. The method of claim 1, wherein the wireless communication device is communicatively coupled with a camera device, further comprising executing a first remote control program to instruct the camera with to capture an image.

4. The method of claim 3, further comprising executing a second remote control program to send the captured image to a remote location.

5. The method of claim 1, wherein the remote control access point is a customer service workstation integral to the wireless communication network.

6. The method of claim 1, wherein the remote control access point is communicatively coupled with the wireless communication network via the internet.

7. The method of claim 1, wherein the remote control access point is a wireless communication device.

8. The method of claim 1, wherein the plurality of remote control programs includes a program that is unavailable to a user of the wireless communication device.

9. The method of claim 1, further comprising receiving a new remote control program from the remote control access point; and executing the new remote control program on the wireless communication device.

10. The method of claim 1, wherein the scheduled remote control program is configured to execute a plurality of remote control programs.

11. The method of claim 1, further comprising notifying a user of the wireless communication device that a remote control session has been established.

12. The method of claim 1, further comprising not notifying a user of the wireless communication device that a remote control session has been established.

13. The method of claim 1, further comprising receiving an instruction from the remote control access point to execute a particular remote control program; and executing the particular remote control program to prevent use of the wireless communication device by a local user.

14. A remote control enabled wireless communication device capable of establishing a data call over a wireless communication network comprising:
a communication means configured to establish a data call with a remote control access point over a wireless communication network;
a data storage area configured to store authentication information and executable programs;
a plurality of executable remote control programs housed in the data storage area;
a microprocessor communicatively coupled with the data storage area and configured to execute the plurality of executable remote control programs; and
an authentication program stored in the data storage area and executable by the microprocessor, the authentication program configured to validate a remote control request received from the remote control access point, wherein the microprocessor is configured to schedule the execution of a remote control program at a future time, where in the future time is after the data call is terminated.

15. The wireless communication device of claim 14, wherein at least one of the executable programs stored in the data storage area cannot be executed by a user of the wireless communication device.

16. The wireless communication device of claim 14, wherein an executable program stored in the data storage is configured to prevent use of the wireless communication device by a local user.

17. The wireless communication device of claim 14, wherein the communication means is configured to receive a new remote control program from the remote control access point and store the new remote control program in the data storage area.

18. The wireless communication device of claim 17, wherein the microprocessor is configured to execute the new remote control program.

* * * * *